United States Patent
Scheffer et al.

(10) Patent No.: US 10,067,008 B2
(45) Date of Patent: Sep. 4, 2018

(54) CAPACITIVE SENSOR

(71) Applicant: VORBECK MATERIALS CORP., Jessup, MD (US)

(72) Inventors: Dan F Scheffer, Frederick, MD (US); Louise Brooks, Washington, DC (US); Paige J Boehmcke, Baltimore, MD (US); Mathew A Hudspeth, Catonsville, MD (US)

( * ) Notice: Subject to any disclaimer, the term of this patent is extended or adjusted under 35 U.S.C. 154(b) by 0 days.

(21) Appl. No.: 15/136,546

(22) Filed: Apr. 22, 2016

(65) Prior Publication Data

US 2016/0313194 A1 Oct. 27, 2016

Related U.S. Application Data

(60) Provisional application No. 62/151,221, filed on Apr. 22, 2015.

(51) Int. Cl.
*G06F 3/044* (2006.01)
*G01L 1/14* (2006.01)
*G06F 3/041* (2006.01)

(52) U.S. Cl.
CPC .............. *G01L 1/142* (2013.01); *G06F 3/044* (2013.01); *G06F 3/0414* (2013.01); *G06F 2203/04103* (2013.01); *G06F 2203/04106* (2013.01); *G06F 2203/04107* (2013.01); *G06F 2203/04112* (2013.01)

(58) Field of Classification Search
CPC ............... G06F 3/044; G06F 3/041; G06F 2203/04112; G06F 2203/04103; G06F 2203/04106; G06F 2203/04107

USPC ............ 73/862.041–862.046; 345/173–174; 29/829

See application file for complete search history.

(56) References Cited

U.S. PATENT DOCUMENTS

| 4,680,429 | A | 6/1987 | Murdock | |
|---|---|---|---|---|
| 5,898,426 | A | 4/1999 | Kim | |
| 6,673,390 | B2 | 1/2004 | Chen | |
| 7,658,901 | B2 * | 2/2010 | Prud'Homme | C01B 31/043 423/415.1 |
| 8,278,757 | B2 * | 10/2012 | Crain | C09C 1/46 174/257 |
| 8,508,680 | B2 * | 8/2013 | Geaghan | G06F 3/044 349/12 |

(Continued)

OTHER PUBLICATIONS

Philip T. Krien The Electroquasistatics of the Capacitive Touch Panel, IEEE Transactions on Industry Applications, vol. 26, No. 3, May/Jun. 1990, p. 529-534.

*Primary Examiner* — Jonathan Dunlap
(74) *Attorney, Agent, or Firm* — Trentice V. Bolar, Esq.

(57) ABSTRACT

Embodiments of the present invention relate to graphene-based capacitive sensors. In one embodiment, a touch sensor comprises a non-porous insulating substrate having a first side and a second side. A first conductive material is at least partially in communication with the first side. A second conductive material is at least partially in communication with the first side. A third conductive material is at least partially in communication with the second side. The first conductive material and the second conductive material are in communication. The first conductive material forms a linearization pattern. The first conductive material includes a metal. The second conductive material and/or third conductive material comprise graphene sheets.

14 Claims, 6 Drawing Sheets

(56) References Cited

U.S. PATENT DOCUMENTS

| | | | |
|---|---|---|---|
| 8,564,547 B2 | 10/2013 | Amireh | |
| 8,610,690 B2* | 12/2013 | Halsey, IV | G06F 3/044 178/18.06 |
| 8,661,662 B1* | 3/2014 | Cok | G06F 3/044 29/622 |
| 8,780,074 B2* | 7/2014 | Castillo | G06F 3/044 345/174 |
| 9,098,162 B2* | 8/2015 | Ahn | G06F 3/045 |
| 9,479,153 B2* | 10/2016 | Marques | H03K 17/16 |
| 9,630,183 B2* | 4/2017 | Cheng | B01L 99/00 |
| 9,632,542 B2* | 4/2017 | Li | G06F 1/1692 |
| 9,658,708 B2* | 5/2017 | Misaki | G06F 3/0412 |
| 2003/0137498 A1* | 7/2003 | Huang | G06F 3/044 345/173 |
| 2007/0103446 A1* | 5/2007 | Chien | G06F 3/045 345/173 |
| 2009/0322705 A1* | 12/2009 | Halsey, IV | G06F 3/044 345/174 |
| 2010/0001975 A1* | 1/2010 | Jiang | G06F 1/1626 345/174 |
| 2010/0044122 A1* | 2/2010 | Sleeman | G01D 5/2405 178/18.06 |
| 2011/0050605 A1* | 3/2011 | Pan | G06F 3/044 345/173 |
| 2011/0080368 A1* | 4/2011 | Lee | G06F 3/045 345/174 |
| 2011/0100727 A1* | 5/2011 | Choi | G06F 3/0418 178/18.01 |
| 2011/0102361 A1* | 5/2011 | Philipp | G06F 3/044 345/174 |
| 2011/0189452 A1* | 8/2011 | Lettow | B05D 3/10 428/220 |
| 2012/0032916 A1* | 2/2012 | Enoki | G06F 3/044 345/174 |
| 2012/0194259 A1* | 8/2012 | Hsu | G06F 3/044 327/517 |
| 2012/0306792 A1* | 12/2012 | Powers | G06F 3/044 345/173 |
| 2013/0009905 A1* | 1/2013 | Castillo | G06F 3/044 345/174 |
| 2013/0147739 A1* | 6/2013 | berg | G06F 3/0488 345/173 |
| 2013/0235285 A1* | 9/2013 | Rowe | G02F 1/13338 349/12 |
| 2014/0050903 A1* | 2/2014 | Lettow | H01B 1/24 428/201 |
| 2014/0204059 A1* | 7/2014 | Geaghan | G06F 3/0416 345/174 |
| 2015/0000962 A1* | 1/2015 | Gao | H05K 1/0274 174/253 |
| 2016/0062500 A1* | 3/2016 | Kessler | G06F 3/0414 345/174 |
| 2016/0092015 A1* | 3/2016 | Al-Dahle | G06F 3/044 345/174 |
| 2016/0282978 A1* | 9/2016 | Wang | G06F 3/044 |
| 2016/0326388 A1* | 11/2016 | Petcavich | C09D 11/101 |
| 2016/0378256 A1* | 12/2016 | Lee | G06F 3/041 345/174 |

* cited by examiner

CAPACITIVE SENSOR

CROSS-REFERENCE TO RELATED APPLICATIONS

This application claims priority to U.S. Provisional Application No. 62/151,221 filed Apr. 22, 2015, which is hereby incorporated herein by reference.

BACKGROUND

The present invention relates generally to capacitive sensors and specifically to graphene-based capacitive sensors. Capacitive sensors, such as touchpads, are computer input devices that can include one or more touch sensitive areas, which can sense the position of a user's finger (or fingers) on its surface to provide a platform for interactive input. Capacitive sensors can utilize surface capacitance to determine the position of the user's finger (or fingers). Capacitive sensors can alternatively utilize projected capacitance to determine the position of the user's finger (or fingers).

DETAILED DESCRIPTION

Figure 1:
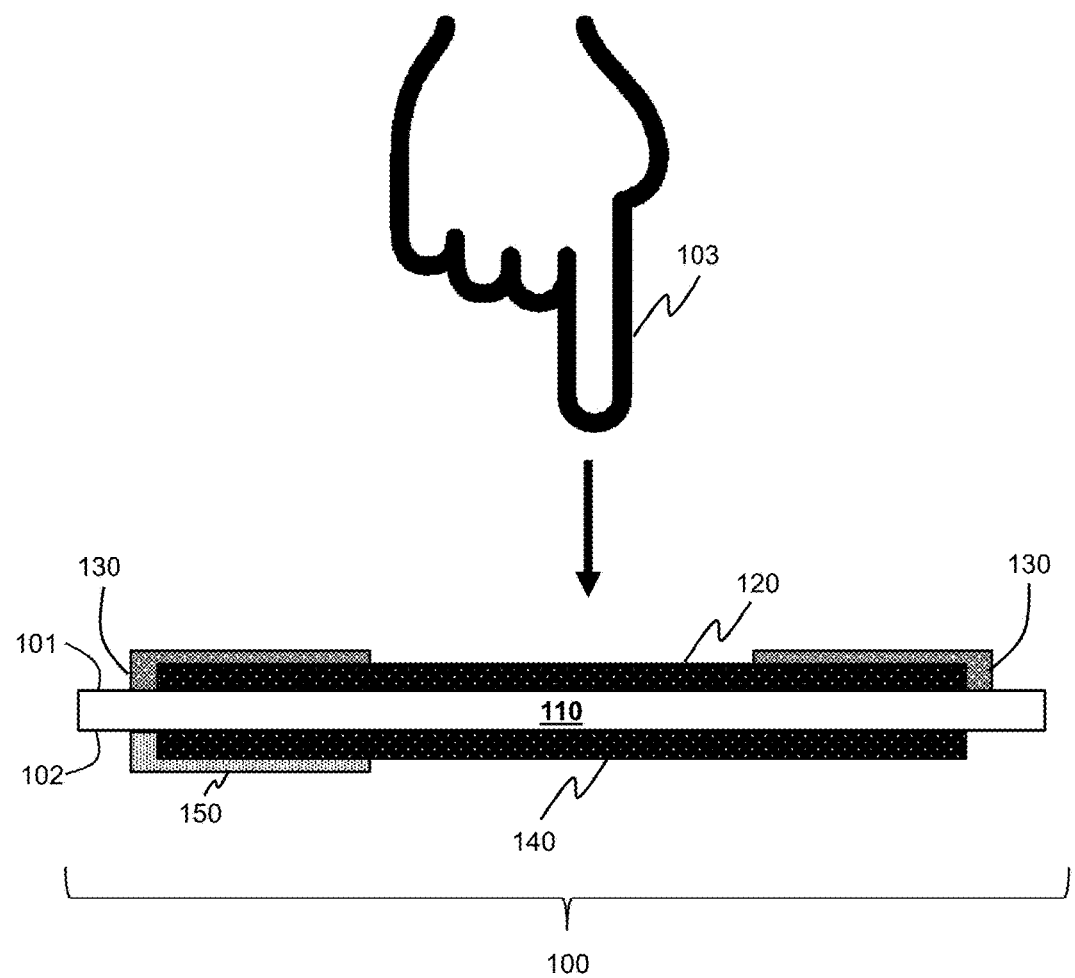
FIG. 1 depicts a capacitive assembly stack, generally 100, in accordance with an embodiment of the present invention.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Certain terminology may be employed in the following description for convenience rather than for any limiting purpose. For example, the terms "forward" and "rearward," "front" and "rear," "right" and "left," "upper" and "lower," and "top" and "bottom" designate directions in the drawings to which reference is made, with the terms "inward," "inner," "interior," or "inboard" and "outward," "outer," "exterior," or "outboard" referring, respectively, to directions toward and away from the center of the referenced element, the terms "radial" or "horizontal" and "axial" or "vertical" referring, respectively, to directions or planes which are perpendicular, in the case of radial or horizontal, or parallel, in the case of axial or vertical, to the longitudinal central axis of the referenced element, and the terms "downstream" and "upstream" referring, respectively, to directions in and opposite that of fluid flow. Terminology of similar import other than the words specifically mentioned above likewise is to be considered as being used for purposes of convenience rather than in any limiting sense.

In the FIGS., elements having an alphanumeric designation may be referenced herein collectively or in the alternative, as will be apparent from context, by the numeric portion of the designation only. Further, the constituent parts of various elements in the figures may be designated with separate reference numerals which shall be understood to refer to that constituent part of the element and not the element as a whole. General references, along with references to spaces, surfaces, dimensions, and extents, may be designated with arrows. Angles may be designated as "included" as measured relative to surfaces or axes of an element and as defining a space bounded internally within such element therebetween, or otherwise without such designation as being measured relative to surfaces or axes of an element and as defining a space bounded externally by or outside of such element therebetween. Generally, the measures of the angles stated are as determined relative to a common axis, which axis may be transposed in the figures for purposes of convenience in projecting the vertex of an angle defined between the axis and a surface which otherwise does not extend to the axis. The term "axis" may refer to a line or to a transverse plane through such line as will be apparent from context.

Capacitive sensors, such as touchpads, are computer input devices that can include a plurality of touch sensitive areas. Capacitive sensors can sense the position of a user's finger (or fingers) on its surface to provide a platform for interactive input. Capacitive sensors can function by the use of surface capacitance. Such sensors can comprise insulator material that is coated on one side with conductive material. A small voltage can be applied to the conductive material in a manner to form a uniform electrostatic field. When a conductor, such as a human finger, touches the uncoated surface, a capacitor can be formed. As a result of surface dimensions, each corner of the sensor is measured to have a different effective capacitance. A controller can determine the location of the touch indirectly from the change in the capacitance as measured from the four corners of the insulated sensor. Here, the larger the change in capacitance, the closer the touch is to that particular corner.

Capacitive sensors can also utilize projected capacitance to sense the position of the user's finger (or fingers) on its surface. Such capacitive sensors typically comprise a conductive layer that is etched into a grid of perpendicular layers of conductive material having parallel lines or tracks to form the grid. Capacitive sensors typically require no direct contact between the sensor and the finger(s).

Embodiments of the present invention seek to provide graphene-based capacitive sensors ("the capacitive sensors"). The capacitive sensors can utilize surface capacitance to determine the location of a finger (or fingers). The capacitive sensors can utilize projected capacitance to determine the location of a finger (or fingers). The capacitive sensors can be flexible capacitive sensors. The capacitive sensors can comprise a substrate having one or more layers ("the layers") applied to one or more of its sides.

The layers can be applied to the substrate and/or one another using an adhesive or a forming technique, including but not limited to printing, coating, heat sealing, laminating, and/or spraying. In general, the layers can be applied to the substrate using any technique that can form layers on or adhere layers to the substrate or each other, in accordance with an embodiment of the present invention. Applicable substrates can include non-porous insulating substrates, including but not limited to, vinyl, thermoplastic polyurethane ("TPU"), polyethylene terephthalate ("PET"), polyethylene ("PE"), Kapton®, and polyurethane ("PU"). The layers can comprise a conductive composition ("the composition"). The composition can include one or more metals ("the metallic composition"). The one or more metals can include, but are not limited to, Ag, Au, Cu, Pb, Sn, steel, and Al. The composition can comprise individual graphene sheets, graphite oxide, and/or carbon.

The composition and/or individual graphene sheets can be prepared and/or formed as disclosed in U.S. Pat. No. 7,658,901 B2 to Prud'Homme et al., U.S. 2011/0189452 A1 to Lettow et al., U.S. 2014/0050903 A1 to Lettow et al., and/or U.S. Pat. No. 8,278,757 B2 to Crain et al., which are hereby incorporated by reference in their entirety. The layers may comprise one or more insulating layers having insulating material. The insulating material can comprise insulating solid films, including but not limited to, PET films. The insulating material can comprise an insulating adhesive. The insulating material can include one or more UV-curable insulating inks. The UV-curable inks can include UV-oligomers resins, UV monomers, and photo-initiators.

Applicable UV oligomer resins include, but are not limited to, urethane acrylate, amine modified polyester acrylate, aisobornylacrylate, polyurethane acrylate, epoxy acrylate, polyether acrylate, and polyester acrylate. Applicable UV monomers include, but are not limited to, isobornyl acrylate ("IBOA"), hexanediol diacrylate ("HDDA"), trimethylopropane triacrylate ("TMPTA"), butainediol diacrylate ("BDDA"), hexanediol diacrylate ("HDDA"), tripropylene glycol diacrylate ("TPGDA"), dipropylene glycol diacrylate ("DPGDA"), and phenoxyethyl acrylate ("POEA"). Applicable photo-initiators can include, but are not limited to, alpha hydroxyl ketones type initiators, such as 1-hydroxy-cyclohexyl-phenyl-ketone, 1-hydroxy-2-methyl-1-propanone, 2-hydroxy-1-(4-(4-(2-hydroxy-2-methyl-propionyl-benzyl)-phenyl)-2-methyl-propan-1-one, and 2-hydroxy-1-(4-(2-hydroxethoxy)phenol)-2-methyl-1-propanone.

Applicable photo-initiators can include, but are not limited to, photo-initiators that are benzophenone-based, phenylglyoxylate-based, and/or benzyl dimethyl ketal-based. Applicable photo initiators can include photo-initiators that are phenylglyoxylate-based, including but not limited to, oxy-phenyl-acetic acid 2-(oxo-2-phenyl-acetoxy-ethoxy)-ethyl ester, oxy-phenyl-acetic acid 2-(2-hydroxy-ethoxy)-ethyl ester, and phenyl glyoxylic acid methyl ester. Thermal curable insulating inks can include insulating pigments and/or insulating binders. Applicable insulating pigments can include, but are not limited to, polytetrafluoroethylene (PTFE), ceramic microspheres, barium titanate, nepheline syenite, alumina silicate, silica, titanium oxide, glass beads, polyethylene waxes (such as MPP-230F and MPP-230VF), micronized polyolefin waxes (such as Acumist A6 and Acumist B12), Beeswax, Carnauba wax, polystyrene, a saponified ester wax of montanic acids (such as Licowax® OP and Licowax® E), a amide wax of type N,N-bis-stearyl ethylenediamine (such as Licowax® C). Applicable insulating binders can include, but are not limited to, polyvinyl alcohol, polyvinyl acetate, polyvinyl chloride, polyvinyl butyral, epoxy, and acrylic.

FIG. 1 depicts a capacitive sensor assembly stack ("stack"), generally 100, in accordance with an embodiment of the present invention. Specifically, FIG. 1 is a cut through view of stack 100. Stack 100 is a capacitive sensor assembly stack. Structure 100 can comprise substrate 110, which comprises first side 101 and second side 102. First side 101 can be proximate to user finger 103. Second side 102 is positioned opposite to first side 101. Layer 140 can be formed on second side 102. Layer 140 can comprise the composition. Layer 150 can be applied to at least a portion of layer 140 and/or second side 102. Layer 150 can comprise the metallic composition. Alternatively, layer 150 can be applied directly on second side 102 and layer 140 can be applied/formed on at least a portion of layer 150 and/or substrate 110.

Figure 2:
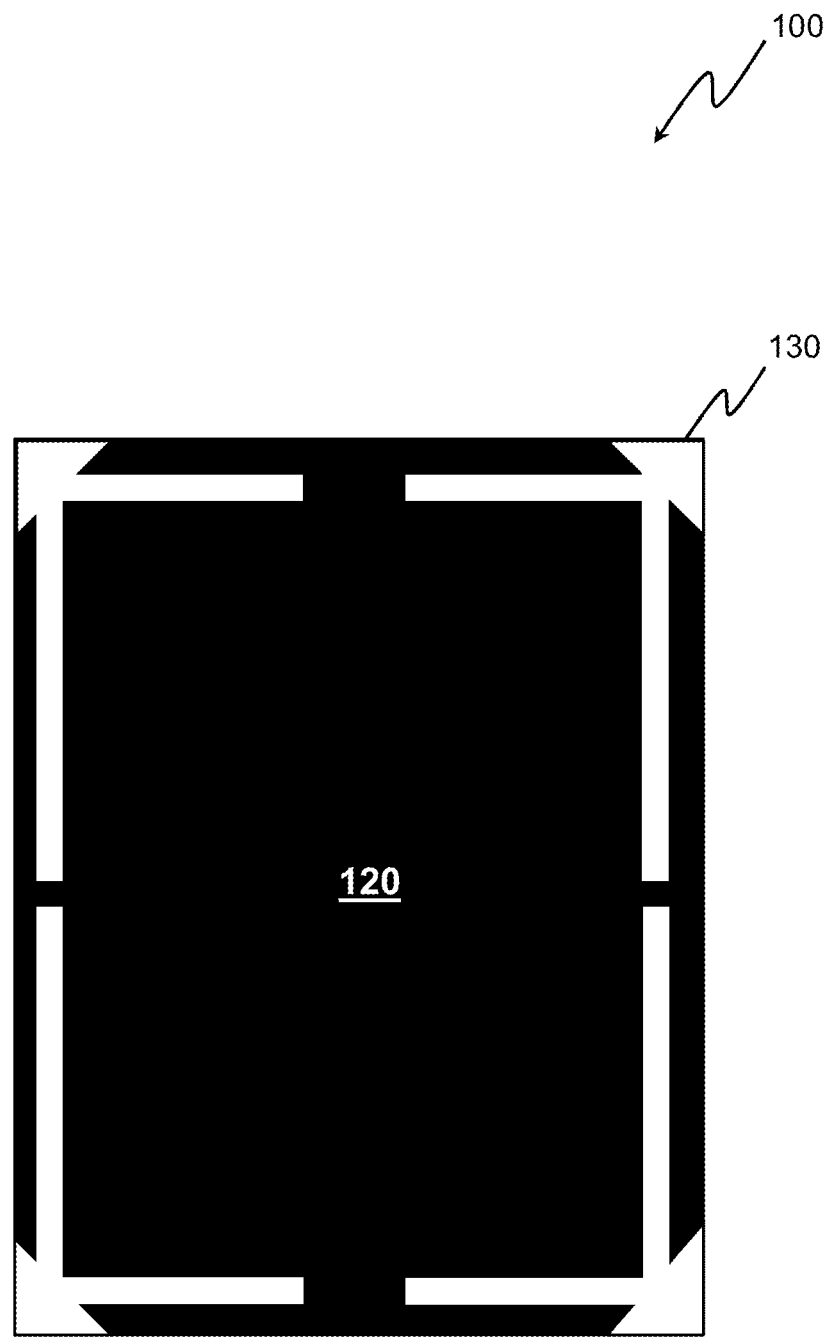
FIG. 2 depicts illustrates a top view of the capacitive assembly stack, in accordance with an embodiment of the present invention.

Layer 120 can be applied to first side 101. Layer 120 can comprise the composition. Layer 130 can be formed on first side 101 and/or layer 120. Layer 130 can comprise the metallic composition. Layer 130 can be applied in a manner to form a linearization pattern, in accordance with an embodiment of the present invention. Stack 100 can operate via surface capacitance to determine the location of finger 103. FIG. 2 illustrates the top view of structure 100, in accordance with an embodiment of the present invention. Although layer 130 is depicted as comprising four linearization ends having dual solid filled extending traces, layer 130 can comprise extending traces having interlocking geometric shapes, for example, diamond and circular.

Figure 3:
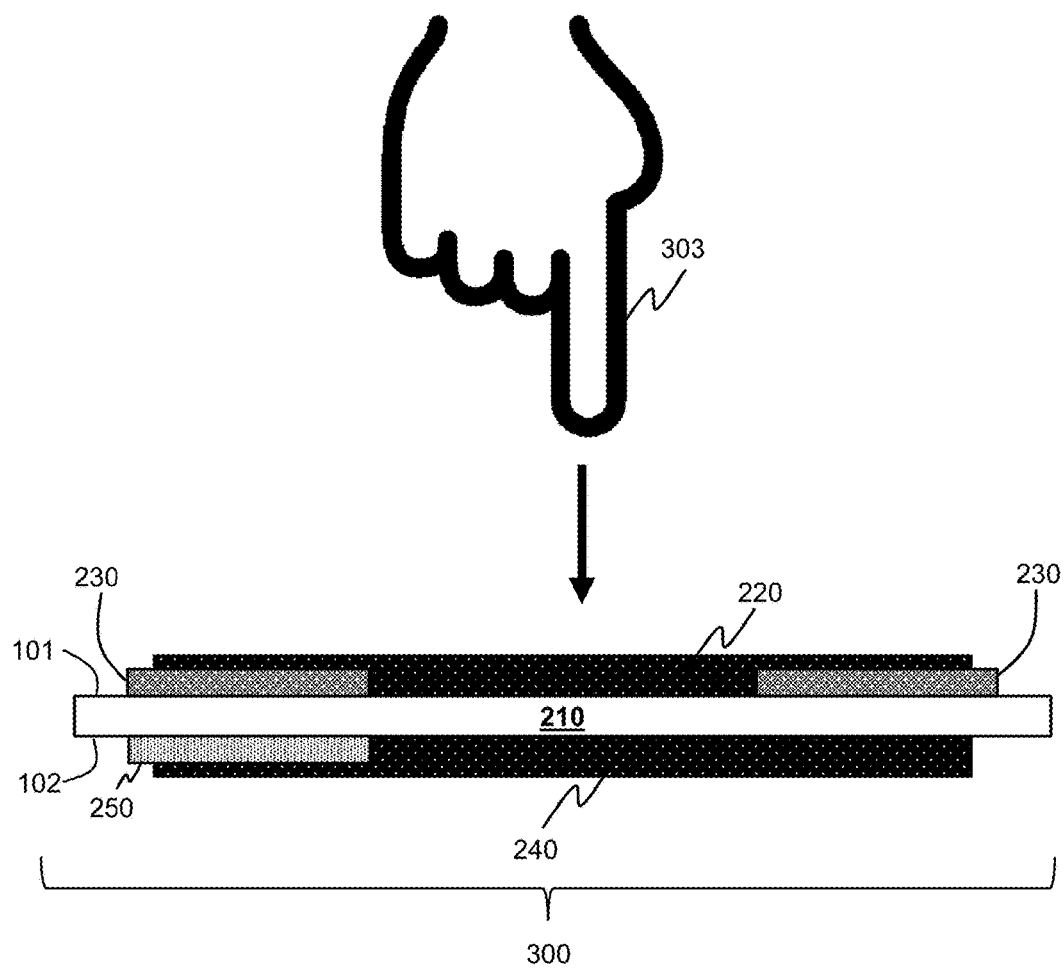
FIG. 3 depicts a capacitive assembly stack, generally 300, in accordance with an embodiment of the present invention.

FIG. 3 depicts a stack, generally 300, in accordance with an embodiment of the present invention. Specifically, FIG. 3 is a cut through side view of stack 300. Stack 300 comprises the components of stack 100 (discussed above) arranged in a different order. Layer 250 can be formed on second side 102. Layer 240 can be formed on at least a portion of layer 250 and/or second side 102. Layer 230 can be formed on at least a portion of first side 101 of substrate 210 in a manner to mirror the position of layer 240 on second side 102. Layer 230 can be formed in a manner to reflect a linearization pattern. Layer 220 can be formed on at least a portion of layer 230 and/or first side 101.

Layers 120, 130, 140, 150, 220, 230, 240 and/or 250 can each have a thickness of about 2 μm to about 2.5 μm, about 2.5 μm to about 3 μm, about 3 μm to about 3.5 μm, about 3.5 μm to about 4 μm, about 4 μm to about 4.5 μm, about 4.5 μm to about 5 μm, about 5 μm to about 5.5 μm, about 5.5 μm to about 6 μm, about 6 μm to about 6.5 μm, about 6.5 to about 7 μm, about 7 μm to about 7.5 μm, about 7.5 μm to about 8 μm, about 8 μm to about 8.5 μm, about 8.5 μm to about 9 μm, about 9 μm to about 9.5 μm, about 9.5 μm to about 10 μm, about 10 μm to about 10.5 μm, about 10.5 μm to about 11 μm, about 11 μm to about 11.5 μm, about 11.5 μm to about 12 μm, about 12 μm to about 12.5 μm, about 12.5 μm to about 13 μm, about 13 μm to about 13.5 μm, about 13.5 μm to about 14 μm, about 14 μm to about 14.5 μm, or about 14.5 μm to about 15 μm.

Figure 4:
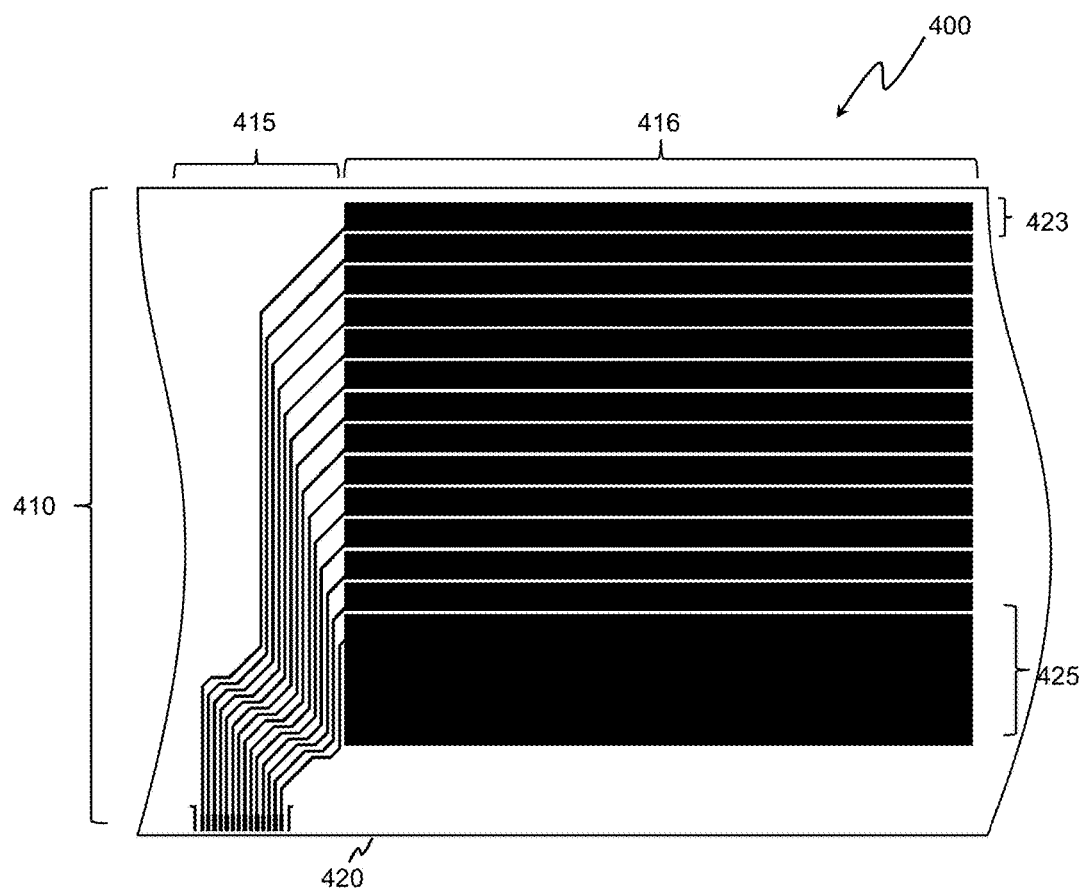
FIG. 4 depicts a bottom view of a structure, generally 400, in accordance with an embodiment of the present invention.

The capacitive sensors of the present invention can also function via projected capacitance. FIG. 4 depict a bottom view of a capacitive structure, generally 400, in accordance with an embodiment of the present invention. Structure 400 can be a component of a capacitive sensor that utilizes projected capacitance to determine the location of finger 303. Structure 400 can comprise substrate 420. Electrode pins 410 can be formed on the bottom of substrate 420. Electrode pins 410 can comprise the composition. Electrode pins 410 can each comprise a trace 415 that is in communication with an electrode 416. Electrodes 416 can each have a width 423 or 425. Electrode pins 410 (including electrode pins 510, discussed below) can be formed in a manner to have a thickness of about 2 μm to about 2.5 μm, about 2.5 μm to about 3 μm, about 3 μm to about 3.5 μm, about 3.5 μm to about 4 μm, about 4 μm to about 4.5 μm, about 4.5 μm to about 5 μm, about 5 μm to about 5.5 μm, about 5.5 μm to about 6 µm, about 6 µm to about 6.5 µm, about 6.5 to about 7 µm, about 7 µm to about 7.5 µm, about 7.5 µm to about 8 µm, about 8 µm to about 8.5 µm, about 8.5 µm to about 9 µm, about 9 µm to about 9.5 µm, about 9.5 µm to about 10 µm, about 10 µm to about 15 µm, about 15 µm to about 20 µm, about 20 µm to about 25 µm, about 25 µm to about 30 µm, about 30 µm to about 35 µm, about 35 µm to about 40 µm, about 40 µm to about 45 µm, about 45 µm to about 50 µm, about 50 µm to about 55 µm, about 55 µm to about 60 µm, about 60 µm about 65 µm, about 65 µm to about 70 µm, about 70 µm to about 75 µm, about 75 µm to about 80 µm, about 80 µm to about 85 µm, about 85 µm to about 90 µm, about 90 µm to about 95 µm, or about 95 µm to about 100 µm.

Widths 423 and/or 425 can be about 0.25 mm to about 0.5 mm, about 0.5 mm to about 0.75 mm, about 0.75 mm to about 1 mm, about 1 mm to about 1.25 mm, about 1.25 mm to about 1.5 mm, about 1.5 mm to about 1.75 mm, about 1.75 mm to about 2 mm, about 2 mm to about 2.25 mm, about 2.25 mm to about 2.5 mm, about 2.5 mm to about 2.75 mm, about 2.75 mm to about 3 mm, 3 mm to about 3.25 mm, about 3.25 mm to about 3.5 mm, about 3.5 mm to about 3.75 mm, about 3.75 mm to about 4 mm.

Figure 5:
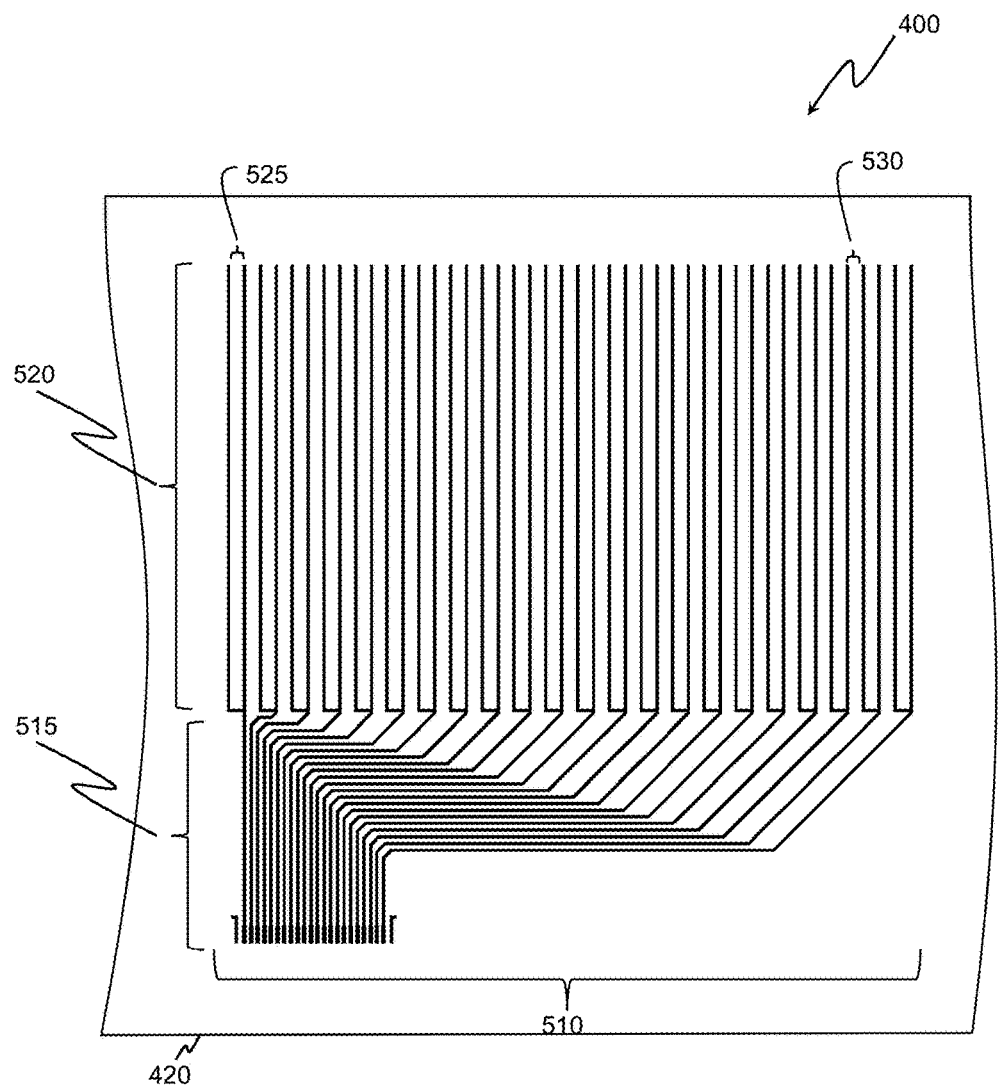
FIG. 5 depicts a top view of the structure, in accordance with an embodiment of the present invention.

FIG. 5 depicts a top view of capacitive structure 400, in accordance with an embodiment of the present invention. Substrate 420 can also have a top side, wherein electrode pins 510 can be formed upon. In certain embodiments, electrode pins 510 can be formed on a separate substrate having similar characteristics as substrate 420, wherein the two substrates are subsequently adhered together to expose electrode pins 410 and 510. Electrode pins 510 can comprise one or more copies of trace 515, wherein each copy of trace 515 can be in communication with a copy of electrode pair 520. Each element in electrode pair 520 may be separated by width 525. Each adjacent copy of electrode pair 520 can be separated by width 530.

Widths 525 and 530 can be substantially similar. Widths 525 and 530 can be dissimilar. For example width 525 and/or 530 can be about 0.5 mm to about 1 mm, about 1 mm to about 1.5 mm, about 1.5 mm to about 2 mm, about 2 mm to about 2.5 mm, about 2.5 mm to about 3 mm, about 3 mm to about 3.5 mm, about 3.5 mm to about 4 mm, about 4 mm to about 4.5 mm, about 4.5 mm to about 5 mm, about 5 mm to about 5.5 mm, about 5.5 mm to about 6 mm, about 6 mm to about 6.5 mm, about 6.5 mm to about 7 mm. Elements that comprise electrode pairs 520 can have a width equal to width 420. Electrode pins 510 can be formed on the top side of substrate 420 in a manner to be at least about perpendicular with electrodes 410 that can be present on the bottom side of substrate 420 (not shown). Electrode pins 510 can form the touch side of the capacitive sensor. Electrode pins 510 and electrode pins 410 can have similar thicknesses.

Figure 6:
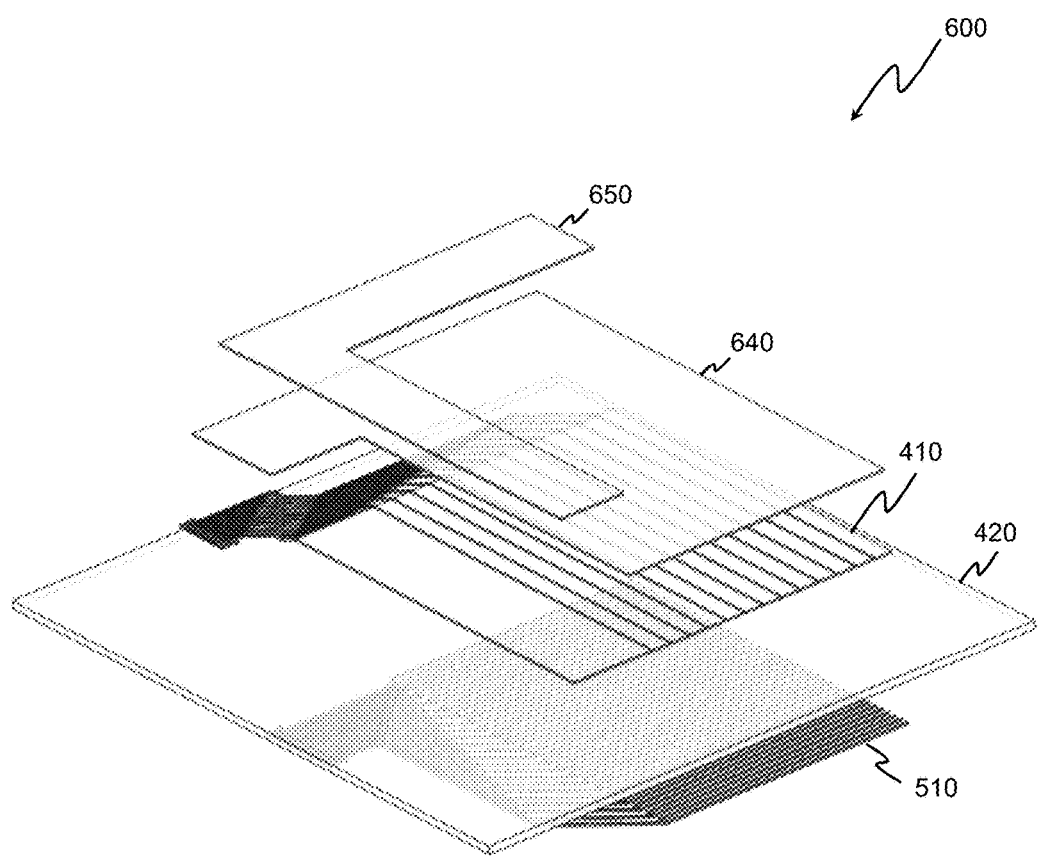
FIG. 6 depicts an exploded view of a capacitive sensor, generally 600, in accordance with an embodiment of the present invention.

FIG. 6 illustrates an exploded view of a capacitive sensor, generally 600, in accordance with an embodiment of the present invention. Capacitive sensor 600 can utilize projective capacitance. Structure 600 can comprise structure 400 (discussed above). Insulating layer 640 can be formed on the sensing regions of electrode pins 410. Insulating layer 640 can comprise any of the aforementioned insulating materials. Ground plate 650 is a grounding layer that can be applied to the non-sensing regions of electrode pins 410 and/or insulating layer 640 utilizing any of the aforementioned techniques. Ground plate 650 can shield at least a portion of electrode pins 410. Ground plate 650 can comprise the metallic composition or one or more metals, including but not limited to, copper, graphene, silver, gold lead, tin, and/or aluminum. Ground plate 650 can be found to have a thickness of about 10 µm to about 15, about 15 µm to about 20 µm, about 20 µm to about 25 µm, about 25 µm to about 30 µm, about 30 µm to about 35 µm, about 35 µm to about 40 µm, about 40 µm to about 45 µm, about 45 µm to about 50 µm, about 50 µm to about 55 µm, about 55 µm to about 60 µm, about 60 µm to about 65 µm, or about 65 µm to about 70 µm.

As various modifications could be made in the constructions and methods herein described and illustrated without departing from the scope of the invention, it is intended that all matter contained in the foregoing description or shown in the accompanying drawings shall be interpreted as illustrative rather than limiting. Thus the breadth and scope of the present invention should not be limited by any of the above-described exemplary embodiments, but should be defined only in accordance with the following claims appended hereto and their equivalents.

What is claimed is:

1. A touch sensor comprising:
   a non-porous insulating substrate comprising a first side and a second side;
   a first pin layer positioned proximate to the first side, wherein the first pin layer comprises a first set of spatially separated parallel electrodes each in electrical communication with a first trace;
   a second pin layer positioned proximate to the second side, wherein the second pin layer comprises a second set of spatially separated parallel electrodes each in electrical communication with a second trace;
   an insulating layer in communication with and positioned over the second set of spatially separated parallel electrodes and the second traces;
   a grounding layer positioned
      over a non-sensing region of the insulating layer;
      over the second traces; and
      adjacent to the first traces;
   wherein the first pin layer, the second pin layer, and/or the grounding layer comprises a conductive composition having graphene sheets;
   wherein the first set of spatially separated parallel electrodes and the second set of spatially separated parallel electrodes are configured to form intersections that correspond to unique touch coordinate pairs; and
   wherein the touch sensor operates via projected-capacitance.

2. The touch sensor of claim 1, wherein the first pin layer is printed on the first side of the substrate.

3. The touch sensor of claim 1, wherein the second pin layer is printed on the second side of the substrate.

4. The touch sensor of claim 1, wherein the first pin layer and/or the second pin layer has a thickness of about 2 µm to about 3 mm.

5. The touch sensor of claim 1, wherein the grounding layer has a thickness of about 10 µm to about 70 µm.

6. The touch sensor of claim 1, wherein the substrate comprises polyethylene terephthalate, Kapton, vinyl, thermoplastic polyurethane, and/or polyurethane.

7. The touch sensor of claim 1, wherein the substrate is flexible or rigid.

8. The touch sensor of claim 1, wherein the first pin layer has a pin width of about 1 µm to about 4 µm.

9. The touch sensor of claim 1, wherein the second pin layer has a pin width of about 0.5 mm to about 5 mm.

10. A touch sensor fabrication method comprising,
    forming a first pin layer on a first side of a substrate, wherein the first pin layer includes a first set of spatially separated parallel electrodes each in electrical communication with a first trace;
    forming a second pin layer on a second side of the substrate, wherein the second pin layer includes a second set of spatially separated parallel electrodes each in electrical communication with a second trace;

positioning an insulating material to be in communication with and positioned over the second set of spatially separated parallel electrodes and the second traces proximate to the second pin layer;
forming a grounding layer to be positioned
over a non-sensing region of the insulating layer;
over the second traces; and
adjacent to the first traces;
wherein the first set of spatially separated parallel electrodes and the second set of spatially separated parallel electrodes are configured to form intersections that represent unique touch pairs; and
wherein the touch sensor operates via projected-capacitance.

11. The touch sensor fabrication method of claim 10, wherein the step of forming the first pin layer and/or second pin layer on the substrate comprises a printing method.

12. The touch sensor fabrication method of claim 10, wherein the first pin layer and/or the second pin layer has a thickness of about 2 μm to about 3 mm.

13. The touch sensor fabrication method of claim 10, wherein the step of forming the grounding layer proximate to the insulating layer comprises a printing method.

14. The touch sensor fabrication method of claim 10, wherein the insulating layer comprises a UV oligomer resin.

\* \* \* \* \*